United States Patent [19]
Buck

[11] Patent Number: 6,079,220
[45] Date of Patent: Jun. 27, 2000

[54] METHOD OF REGULATING THE FILLING LEVEL OF A REFRIGERANT EVAPORATOR

[76] Inventor: Wilhelm Buck, Sankt Huefler Dorfstrasse 32, D-49356 Diepholz, Germany

[21] Appl. No.: 09/091,695

[22] PCT Filed: Jan. 24, 1997

[86] PCT No.: PCT/DE97/00136

§ 371 Date: Jun. 18, 1998

§ 102(e) Date: Jun. 18, 1998

[87] PCT Pub. No.: WO97/28407

PCT Pub. Date: Aug. 7, 1997

[30] Foreign Application Priority Data

Jan. 30, 1996 [DE] Germany .................. 196 03 175

[51] Int. Cl.[7] ............................................... F25B 41/04
[52] U.S. Cl. .................................. 62/212; 62/202; 62/225
[58] Field of Search ........................... 62/126, 129, 202, 62/204, 210, 212, 222, 224, 225; 236/78 D, 92 B

[56] References Cited

U.S. PATENT DOCUMENTS 4,586,828  5/1986  Winter et al. .................... 62/212 X
5,195,331  3/1993  Zimmern et al. ..................... 62/202
5,495,720  3/1996  Buck .................................. 62/225 X
5,502,970  4/1996  Rajendran ........................ 62/212 X

FOREIGN PATENT DOCUMENTS

93/11394  6/1993  WIPO .

*Primary Examiner*—Harry B. Tanner
*Attorney, Agent, or Firm*—Herbert Dubno

[57] ABSTRACT

The invention concerns a method of monitoring, setting and regulating the filling level of a refrigerant evaporator using a throttle valve and a measuring apparatus mounted in the intake line, the measuring signal determined being freed from interfering portions and a useful measured value thus being generated. By using the useful measured value of a flowmeter, the fluctuations in the flow of refrigerant in the intake line are examined with respect to random short-time fluctuations from which a degree of fluctuation is derived. The degree of fluctuation is a measure of the value of the random short-time fluctuations which is simultaneously used for regulation purposes and is compared with a specified value in order to evaluate the quality of the evaporator filling.

10 Claims, 2 Drawing Sheets

METHOD OF REGULATING THE FILLING LEVEL OF A REFRIGERANT EVAPORATOR

CROSS REFERENCE TO RELATED APPLICATIONS

This application is a national stage of PCT/DE97/00136 filed Jan. 24, 1997 and based, in turn, upon German national application 196 03 175.3 filed Jan. 30, 1996 under the International Convention.

FIELD OF THE INVENTION

The invention relates to a process for monitoring, adjusting and controlling the filling level of a refrigerant evaporator operating in a closed cycle of a refrigerating machine and the refrigerant mass flow supplied to the refrigerant evaporator which evaporates the refrigerant to a substantially dry suction line gas and to a refrigerating machine for carrying out the process.

In refrigerating systems operating in a closed cycle, a throttle valve is generally provided between the condenser and the evaporator.

With a throttle valve opened too little, the evaporator is filled too little with refrigerant with the consequence of only a small cooling power (refrigerating capacity). With a throttle valve which is opened too wide the evaporator is flooded with the consequence that the flow of liquid in the suction line has detrimental fluctuations.

It is known that superheating of the gas phase in the suction line for evaporator filling can be used. This superheating is contravariant to the refrigerating capacity of the evaporator, i.e. the smaller the superheating, the greater the refrigerating capacity of the evaporator. However, it must be ensured that the flow of the refrigerant fluid does not have detrimental fluctuations.

The use of superheating has two serious drawbacks.

(a) The superheating is only usable in the steady state.

(b) The smallest yet permissible superheating varies from apparatus to apparatus and from operating state to operating state and there is no possibility of determining this value on line (continuously) in operation. Thus the superheating must not be made so small that the refrigerant mass flow in the suction line will have detrimental fluctuations and the suction line gas will be wet.

From EP 0 613 545 B1 it is known to provide in the suction line downstream from the refrigerant evaporator, a heatable measuring body which is flushed by the suction line gas from the refrigerant evaporator. The measurement body is heated to a temperature which exceeds that of the suction line gas. The impingement of liquid droplets of the refrigerant on the measuring body and thus the moisture content of the suction line gas originating from the refrigerant evaporator is detected in that the energy required for evaporation of the liquid droplets on the measuring body is measured or determined.

Based upon a reference limit value, which establishes the permissible moisture content of the suction line gas, the moisture content in the suction line gas is limited by an appropriate regulation or control. This control regulation process is not concerned with an optimal refrigerating capacity. It provides only a protection of the compressor against liquid impact.

OBJECTS OF THE INVENTION

The invention has as its object to develop a process for monitoring, adjusting and controlling the evaporator filling with the goal of achieving an optimum refrigerant mass flow. This process should be usable under all operating conditions and should be appropriate for all refrigerating apparatus. However, the mass flow of the liquid phase should never exceed the permitted limiting value.

SUMMARY OF THE INVENTION

These objects are attained in a method of monitoring, adjusting and controlling the degree of filling of the refrigerant evaporator which involves a measurement of the fluctuations of the flow of the refrigerant in the suction line and from these short time oscillations or fluctuations, obtaining a measure of fluctuation. This measure has been found to represent an assessment of the degree of the filling of the evaporator and can be compared to a setpoint value. Where the fluctuation measure is less than the setpoint, the supply of refrigerant of the evaporator is increased and where the fluctuation measurement exceeds the setpoint, the refrigerant feed is decreased. The flow meter is preferably a thermal anemometer and the measurements can be made over time intervals of given duration. The fluctuation measurement can result from averaging.

The apparatus can use a thermal anemometer which has a temperature detector heated to a temperature above that of the gas in the suction line with the fluctuation measure being a measurement of the current, power or temperature of the detector being used as the measured signal.

The invention is thus based upon the recognition that the flow of the refrigerant fluid in the suction line pipe has random short-time oscillations (transients), whose amplitude continuously grows with increase in the refrigerant feed and in the region of a special point, which for example depends in an air cooled evaporator, upon the moisture content and the temperature of the air entering the evaporator, extremely sharply increases. The quantification of the amplitude of the random short-time oscillations by means of range values or by means of the deviation of the measured value from a reference line, is a fluctuation measure which is used to determine characteristic lines and a setpoint function for control purposes.

The advantages resulting from the invention reside especially in that a special effect, namely random short time oscillations of the refrigerant fluid in the suction line, are used. Which are effective both in the steady state as well as in transition periods, and from this effect, a fluctuation measure can be obtained which is a measure of the filling of the evaporator. This technique can also be used when superheating gives completely false results.

DESCRIPTION OF THE DRAWING

The above and other objects, features, and advantages will become more readily apparent from the following description, reference being made to the accompanying drawing in which.

SPECIFIC DESCRIPTION

Figure 1:
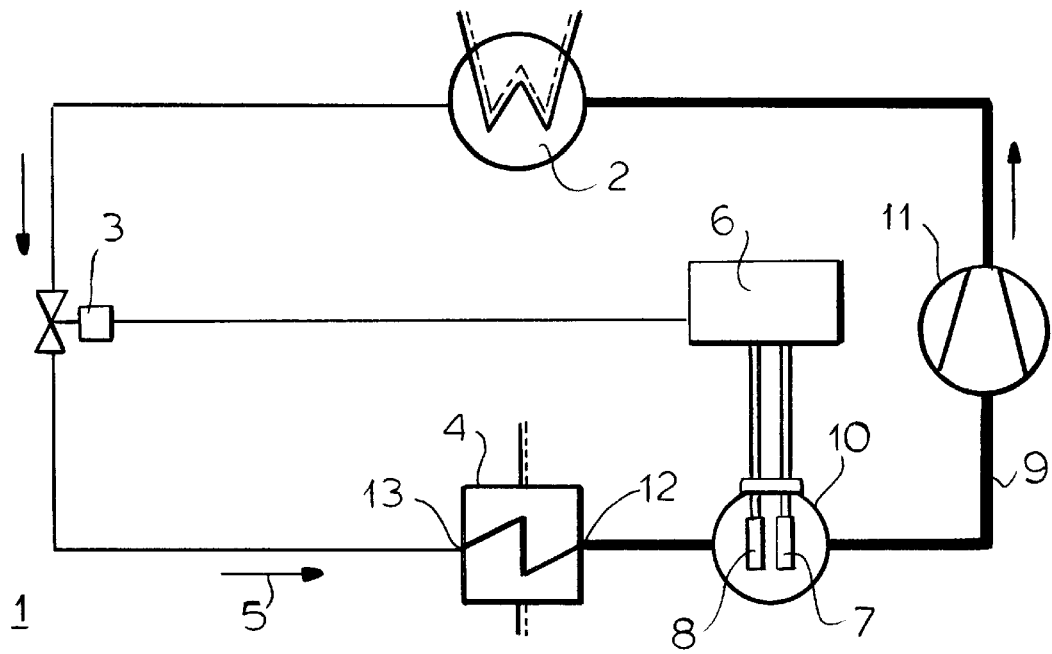
FIG. 1 is a diagram of the principal components of a refrigerating machine according to the invention and for practicing the process of the invention, for adjusting, controlling and monitoring the degree of filling of a refrigerant evaporator.

In FIG. 1 a refrigerating machine is shown which comprises a refrigerant evaporator 4, a compressor 11, a condenser 2 and a throttle valve 3. The refrigerant mass flow 5 traverses a circulation path between a low pressure effective in the evaporator 4 and a higher effective pressure in the condenser 2. A compressor 11 sucks the refrigerant at the outlet 12 of the refrigerant evaporator 4. The so-called suction line gas which represents the refrigerant mass flow 5 which has been evaporated. The suction line gas should be substantially liquid free at the inlet to the compressor 11 and should be free from large fluctuations.

Because of the effect of the compressor 11, the evacuated vapor or the suction line gas which appears at the outlet 12 of refrigerant evaporator 4 is compressed to a high pressure and is condensed in the condenser 2 into a substantially liquid refrigerant mass flow 5, i.e. is liquefied.

To allow the refrigerant mass flow 5 to pass through the refrigerant evaporator 4 with the reduced pressure for the evaporation, in the feed line to the intake 13 of the refrigerant evaporator 4, a throttle valve 3 is provided. This throttle valve 3 can have a known construction for a controllable valve and the magnitude of the refrigerant mass flow 5 can be so adjusted therewith that the refrigerant evaporator 4 is neither overfilled or underfilled and the refrigerant mass flow 5 assumes an optimal magnitude for the respective refrigerating machine and the respective operating state.

The throttle valve 3 can, for example, be a thermostatic expansion valve or capillary tube or a control valve with an electric drive. The valve also can be a magnetic valve which can vary the opening and/or a closing time continuously, i.e. can be matched.

To establish the optimum refrigerating capacity of the evaporator 4 hot-film anemometer 10 is built into the line 9 between the refrigerant evaporator 4 and the compressor 11. This anemometer 10 comprises a heatable resistance temperature detector 7 and a non-heated temperature sensor 8. The anemometer 10 is inserted in the interior of the line 9 and indeed is heat insulated and sealed vacuum and pressure tightly to the parts in its region and against the environment. The anemometer 10 has been shown in cross section in FIG. 1 and to a larger scale for better understanding, in line 9.

The heatable measurement resistor 7 is so heated that its temperature is constant with time, for example 30 K over the suction line gas temperature which is detected by the measurement resistor 8.

The measurement and control process for the described device runs as follows:

The temperature of the heatable measuring body 7 is uninterruptededly heated to a temperature which is constant with time and 30 K above the temperature of the suction gas measured by the measuring resistor 8. To achieve this, the heating voltage must be continuously matched to the measured temperature. This heating voltage forms, in this case, the measuring signal.

Alternatively, also with a constantly maintained overtemperature of the heatable measuring body 7, the heating current can be used as the measurement signal with a constant voltage or as a general matter the continuously matched heating power can be used as the measurement signal.

In another type, the thermal anemometer 10 has its heated measuring body 7 supplied with a constant heating power and the temperature of the heated measurement resistor 7 is used as the measurement signal.

The thermal anemometer 10 reacts to the different flow quantities of the mass flow in suction line 9.

To allow investigation of the random short-time oscillations of the flow of the coolant in suction line 9, a measured value is obtained from the measuring signal of the thermal anemometer which has the random short time oscillations exclusively as a function of time. The measured signal, the usable signal, the measured value and the usable measured value are collectively and for short termed the "measured value" below.

Figure 4:
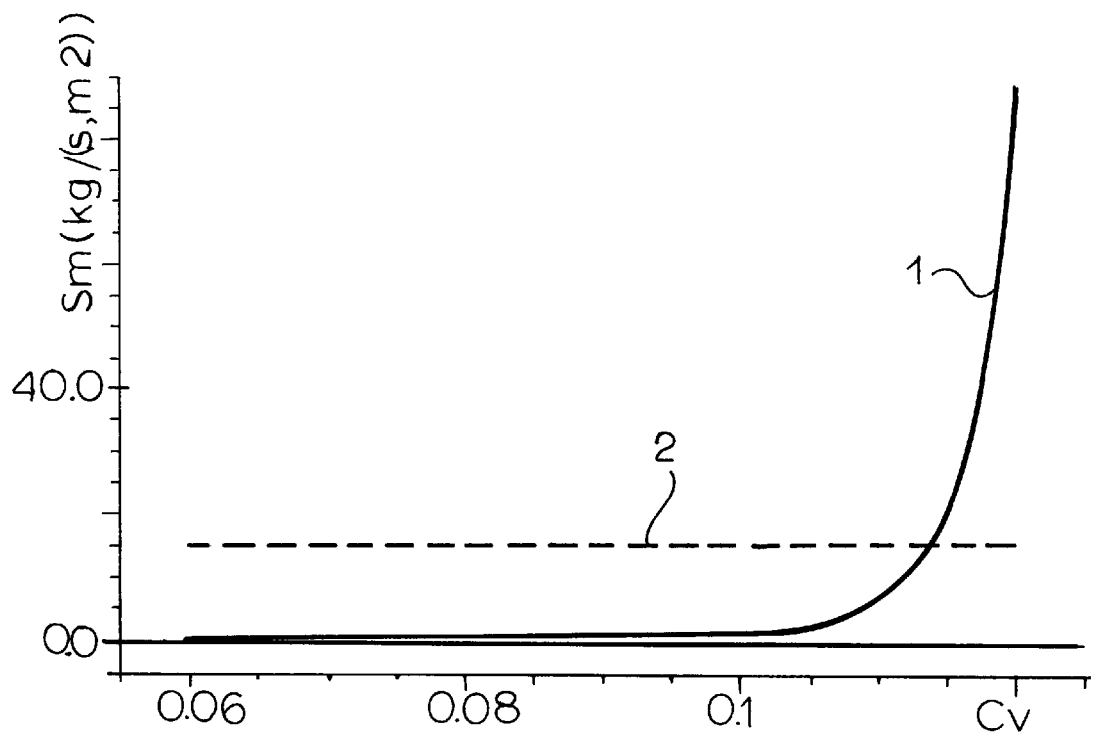
FIG. 4 a characteristic line and a setpoint function for control as a function of the reference value, in this case the flow coefficient of a valve Cv.

For a determination of the characteristic line of the fluctuation value, see curve 1 in FIG. 4, the following process is applied.

After a sufficient number of measured values is determined for each opening state of the throttle valve, the valves of the random short time oscillations are determined and from a number of voltages in a special process, a measure of fluctuation is determined. A simple example of such a fluctuation values from which initially the voltages and subsequently the fluctuation values are determined, reference magnitudes are obtained. In FIG. 4, the flow technological characteristic of valve $C_v$ represents the reference value there shown.

For effecting a control or monitoring process, the last, for example, 40 measured values determine the fluctuation value in to a continuous manner and for optimizing the refrigerating capacity, a respective setpoint is established. This setpoint is so defined that the refrigerating capacity is a maximum but such that the random oscillations enables a control of the refrigerant filling of the evaporator. To determine the optimum refrigerating capacity the control magnitude is compared with a setpoint. This setpoint is a function of the reference magnitude. It is so defined that the cooling power has its maximum value permitting nevertheless control of the evaporator filling by the random oscillations.

Figure 2:
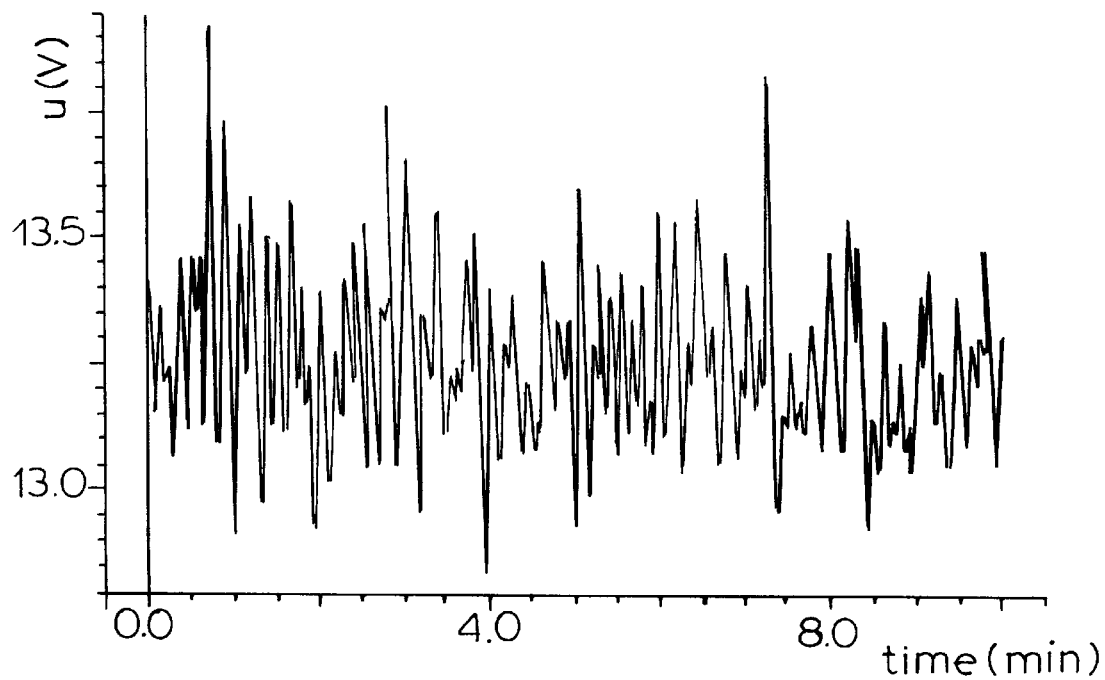
FIG. 2 is a graph of the random short-time oscillations of an averaged measuring signal obtained via a hot film anemometer at a constant temperature differential as a function of time.

The measured value shown in FIG. 2 is determined as follows: with a scanning time of 8.3 ms, 256 value are obtained at each scan and the average value for all of the scanned values for each scan is obtained. The average represents the final measured values.

Figure 3:
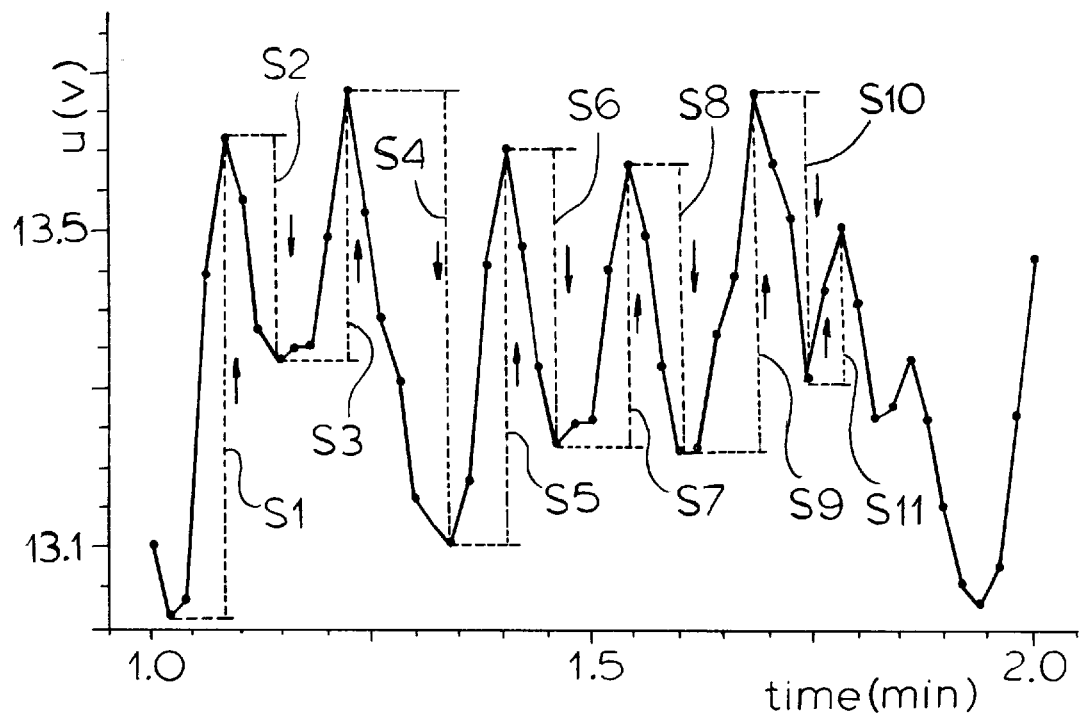
FIG. 3 is a graph of the random short time oscillations of an averaged measurement signal of a hot film anemometer for a short interval with the indicated range values S1 . . . S11.

FIG. 3 shows a portion of FIG. 2. FIG. 3 shows how, according to German Industrial Standard 45667 has the random short term oscillations detected in a minute, and receiving the valves S1 . . . S11 are determined. The voltages between a minimum and the next maximum are positive (Si, S3, S5, S7, S9, S11) those between a maximum and the next minimum are negative (S2, S4, S6, S8, S10). In a variation of this process, all of the valves are treated as positive (or negative). From a number of voltages, a fluctuation measure is obtained. The fluctuation measure can, for example, be the measured value of the valves or another parameter which is obtained from the valves determined. To exclude the effect of small valves, a hysteresis can be introduced.

In FIG. 4, the final measured value of the mass velocity $G_g$ of the gas phase in the suction line 9 is used. To determine the characteristic line, the average value $S_m$ of the range values of the random short term oscillations of the mass velocity $G_g$ of the gas phase is used. The reference parameter here is the flow coefficient of the expansion value C. All range values are counted positively. The illustrated characteristic line 1 is determined by a fitting calculation from the measured value $S_m$ as a function of $C_v$. The average value of $G_g$ belonging to $S_m$, i.e. $G_{g,m}$ can also be used as the reference parameter.

The setpoint curve for the fluctuation value can correspond to the function $S_{set}=a0+a1*X+a2*x2$. In this function, x is the reference parameter. In FIG. 4—see curve 2—$S_{soll}=$ 15.0 kg/(s,m$^2$) represents the setpoint curve. The reference parameter is $C_v$.

Since the control parameter is only determined for a small number of measured values, it varies within a confidence interval about the setpoint curve 2 in FIG. 4.

For an insufficient small fluctuation value, the evaporator is underfilled. The refrigerant supply must then be increased.

As soon as the fluctuation value is above the permissible value the refrigerant feed to the evaporator is throttled.

To differentiate the here described technique it is indicated that the autocorrelation function of the here applied measuring values prove that the investigated oscillations are random, i.e. without a periodic component.

With the use of thermostatic or electrically driven expansion valve frequently a so-called hunting effect is observed. In such cases the flow of the suction line fluid also has oscillations. The use of autocorrelation, however, indicates that it is here periodic and in no way deals with random oscillations.

We claim:

1. A method of controlling a refrigerating machine having a compressor supplying refrigerant to a condenser, an evaporator connected with the condenser, a throttle valve between the condenser and the evaporator, a suction line connecting the evaporator with the compressor and a flowmeter, preferably a thermal anemometer being positioned in the suction line, said method comprising the steps of:

a) applying the measuring signal of the flowmeter to determine fluctuations in a flow of a refrigerant fluid in said suction line;

b) calculating a fluctuation measure from the measured fluctuations;

c) comparing the fluctuation measure with a setpoint; and d) with a fluctuation measure below said setpoint indicating an underfilling of said evaporator, opening said valve to increase refrigerant supplies to said evaporator and upon a fluctuation measure exceeding said setpoint indicating an overfilling of said evaporator reducing the flow of refrigerant from said valve to said evaporator.

2. The method defined in claim 1 wherein the flowmeter is a constant temperature anemometer in said suction line, and the measuring signal being represented by the voltage applied for heating purposes is used to measure the fluctuations of the refrigerant flow.

3. The method defined in claim 1 wherein the flowmeter is a constant-current-anemometer in said suction line and the measuring signal being represented by the temperature of the heated detector above the temperature of the sensor is used to measure the fluctuations of the refrigerant flow.

4. The method defined in claim 1 wherein the flowmeter is a constant-power-anemometer in said suction line and the measuring signal being represented by the temperature of the heated detector above the temperature of the sensor is used to measure the fluctuations of the refrigerant flow.

5. The method defined in claim 1 wherein the fluctuation measure that can be used for control purposes is qualified by applying at first a range counting method on the measuring signal of the thermal anemometer and then an averaging or a different mathematical procedure on the range values generated.

6. A refrigeration apparatus comprising:

a compressor;

a condenser connected to an outlet side of said compressor;

an evaporator connected to said condenser;

a controllable throttle valve positioned between said condenser and said evaporator, said evaporator being connected to a suction side of said compressor by a suction line;

a thermal anemometer in said suction line for measuring fluctuations in a refrigerant flow through said suction line; and means for forming a fluctuation measure from the fluctuations measured by said thermal anemometer and controlling said valve for increasing refrigerant supply to said evaporator upon said fluctuation measure falling below a setpoint and for decreasing refrigerant feed to said evaporator upon said fluctuation measure exceeding said setpoint.

7. The apparatus defined in claim 6 wherein said thermal anemometer is a constant-temperature-anemometer in said suction line and the measuring signal being represented by the voltage used to heat the resistance temperature detector is used to measure the fluctuations of the refrigerant flow.

8. The apparatus defined in claim 6 wherein said thermal anemometer is a constant-current-anemometer in said suction line and the measuring signal being represented by the temperature of the heated detector above the temperature of the sensor is used to measure the fluctuations of the refrigerant flow.

9. The apparatus defined in claim 6 wherein said thermal anemometer is a constant-current-anemometer in said suction line and the measuring signal being represented by the temperature of the heated detector above the temperature of the sensor is used to measure the fluctuations of the refrigerant flow.

10. The apparatus defined in claim 6 wherein said the fluctuation measure that can be used for control purposes is qualified by applying at first a range counting method on the measuring signal of the thermal anemometer and then an averaging or a different mathematical procedure on the range values generated.

* * * * *